(12) United States Patent
Guo

(10) Patent No.: US 11,513,430 B2
(45) Date of Patent: Nov. 29, 2022

(54) REFLECTOR AND OPTICAL SYSTEM OF LCD PROJECTOR

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/238,225

(22) Filed: Apr. 23, 2021

(65) Prior Publication Data

US 2021/0240060 A1    Aug. 5, 2021

(30) Foreign Application Priority Data

Mar. 8, 2021   (CN) .......................... 202110249539.0

(51) Int. Cl.
```
G03B 21/00      (2006.01)
G02F 1/13357    (2006.01)
H04N 9/31       (2006.01)
G02F 1/1335     (2006.01)
```
(52) U.S. Cl.
CPC ....... G03B 21/006 (2013.01); G02F 1/13362 (2013.01); G02F 1/133627 (2021.01); H04N 9/3105 (2013.01); H04N 9/3167 (2013.01)

(58) Field of Classification Search
CPC ............... G03B 21/006; G02F 1/13362; G02F 1/133627; H04N 9/3105; H04N 9/3167
USPC ....................................................... 349/5–10
See application file for complete search history.

(56) References Cited

U.S. PATENT DOCUMENTS

| | | | |
|---|---|---|---|
| 2003/0071972 A1* | 4/2003 | Ito ....................... | G03F 7/70291 353/20 |
| 2011/0181801 A1* | 7/2011 | Okumura ........... | G03B 21/2073 349/5 |

* cited by examiner

*Primary Examiner* — Charles S Chang

(57) ABSTRACT

A reflector includes a reflective film and a substrate, wherein the reflective film is attached to the substrate. Also, an optical system of an LCD (liquid crystal display) projector includes a first reflector, a second reflector, an LED (light emitting diode) light source, a condenser, a collimating lens, an LCD light valve, a field lens and a projection lens, wherein the LED light source, the condenser, the first reflector, the collimating lens, the LCD light valve, the field lens, the second reflector and the projection lens are set in sequence according to a direction of light. The reflector is significantly improved in the reflection efficiency while maintaining the low cost, or the reflector is significantly reduced in the manufacturing cost while achieving the high reflection efficiency, so that the output brightness and the photoelectric efficiency of the projector including the reflector with low cost, which has a very positive effect.

3 Claims, 1 Drawing Sheet

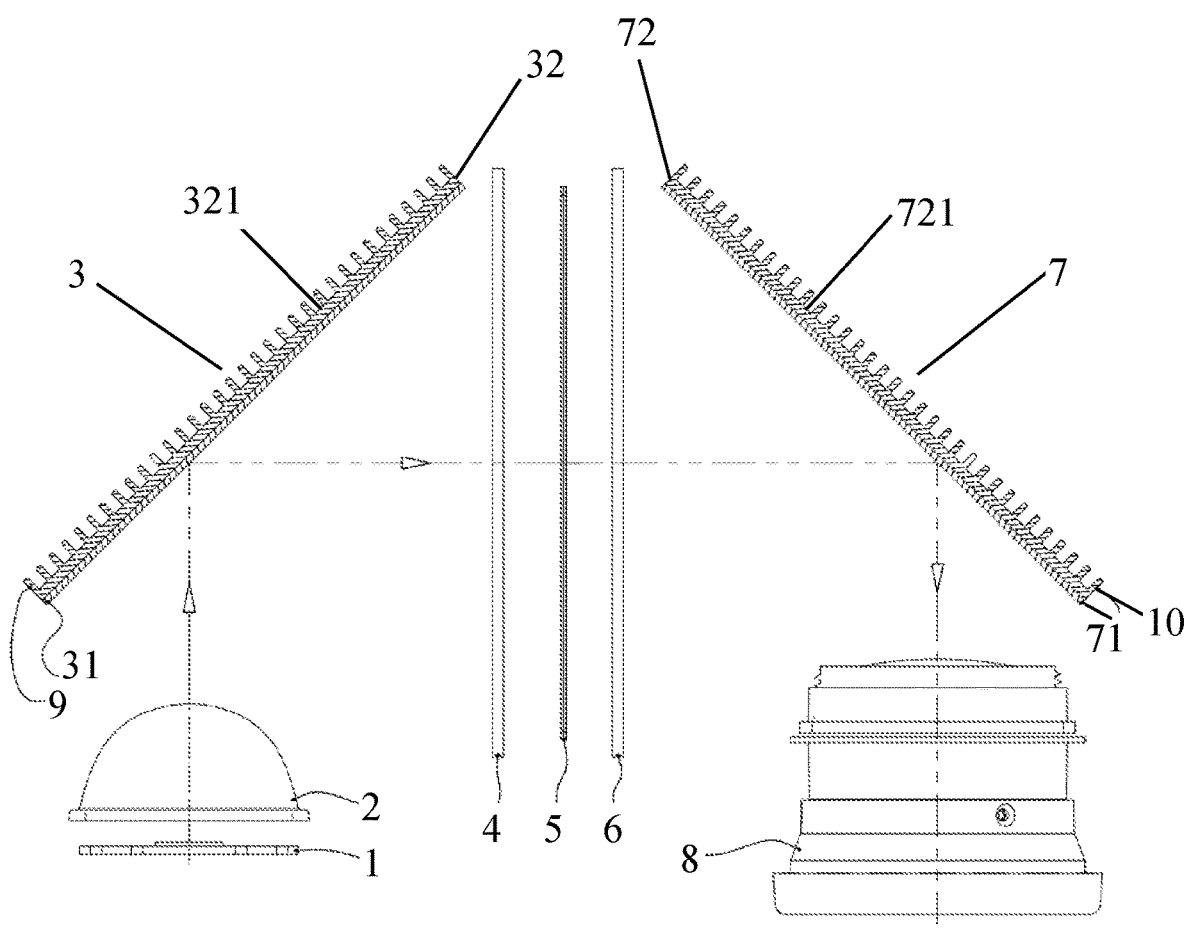

REFLECTOR AND OPTICAL SYSTEM OF LCD PROJECTOR

CROSS REFERENCE OF RELATED APPLICATION

The present invention claims priority under 35 U.S.C. 119(a-d) to CN 202110249539.0, filed Mar. 8, 2021.

BACKGROUND OF THE PRESENT INVENTION

Field of Invention

The present invention relates to the field of projectors, and more particularly to a reflector and an optical system of an LCD (liquid crystal display) projector.

Description of Related Arts

Almost all projectors need one or more planar total reflectors inside to turn the light path, so as to obtain a certain stacking method of components, and finally realize a certain shape and size. Reflectors are indispensable optical components for the projector.

There are three preparation methods to obtain the existing reflectors. The first preparation method includes polishing the surface of the flat optical glass and then coating multi-layer dielectric films thereon, so as to achieve extremely high light reflectivity through certain characteristics of the dielectric in the electromagnetic field. Generally, when the wavelength is in the range of 420 to 660 nm and the incident angle is $\geq 20°$, the average reflectivity is as high as 98.5%, and the single-point wavelength reflectivity is as high as 99.5% or more. However, this reflector is extremely expensive. A commonly used dielectric film reflector with a thickness of 2 mm, a length of 110 mm and a width of 60 mm costs CNY 35-80 according to different performances and different purchase quantities. For domestic projectors, this is unrealistic and is not cost-effective, because the overall cost of many domestic projectors is only about CNY 100.

The second preparation method includes polishing the surface of the flat optical glass and then coating a layer of metal film (such as gold, silver and aluminum) thereon. However, this reflector is general in performance, has the reflectivity in a range of 82% to 92%, has relatively sensitive incident angle characteristics and polarization characteristics, and has poor durability. Moreover, it is necessary to prepare a layer of protective film on the layer of the metal film to isolate the air, which further reduces the reflectivity. The reflector with a thickness of 2 mm, a length of 110 mm and a width of 60 mm costs CNY 12-20, which is still completely unsuitable for domestic projectors.

The third preparation method includes coating a layer of aluminum film on the large plate glass. The average reflectivity (including diffuse reflection) of the prepared reflector is determined by the price and is about 80%-88% (in which the single point wavelength is able to reach about 90% in reflectivity). The prepared reflector has strong polarization, but is not sensitive to the angle. The reflector with a thickness of 2 mm, a length of 110 mm and a width of 60 mm is extremely low in price. Depending on the reflectivity level, each reflector costs about CNY 1.5-2.5, which is cost-effective. Therefore, this reflector is used to manufacture various types of domestic single LCD projectors. A projector uses a reflector, and the brightness loss is about 15%; if two reflectors are used, the brightness loss is about 28%; if three reflectors are used, the brightness loss is as high as 39%, which is very unfortunate.

At the same time, because of the low reflectivity, the absorption rate is inevitably high. Moreover, the thermal conductivity of the glass plate is low, and the specific heat is low, so the reflector absorbs light and converts the light into Joule heat, for continuously heating the glass plate and the reflective film, even up to 200° C. in individual locations, which makes the life of the reflective film very short, some even less than dozens of hours, the reflective film fails. Therefore, under the premise of maintaining low cost, how to increase the reflectivity of the reflector and improve the thermal conductivity and heat dissipation performance of the substrate has become an urgent problem to be solved by those skilled in the art.

SUMMARY OF THE PRESENT INVENTION

An object of the present invention is to overcome the shortcomings of the prior art and provide a reflector. The reflector provided by the present invention is significantly improved in the reflection efficiency while maintaining the low cost, or the reflector is significantly reduced in the manufacturing cost while achieving the high reflection efficiency, which has a very obvious innovative effect.

To achieve the above object, the present invention provides a reflector, which comprises a reflective film and a substrate, wherein the reflective film is attached to the substrate.

Preferably, the reflective film is one of an ESR (enhanced specular reflector) reflective film of 3M Company, a DBEF (dual brightness enhancement film) reflective film of 3M Company, and a ReflecTech reflective film of SkyFuel Company.

Preferably, the substrate is one of a flat glass plate, a metal plate, a plastic plate and a ceramic plate.

Also, the present invention provides an optical system of an LCD (liquid crystal display) projector. The optical system comprises a first reflector, a second reflector, an LED (light emitting diode) light source, a condenser, a collimating lens, an LCD light valve, a field lens and a projection lens, wherein the LED light source, the condenser, the first reflector, the collimating lens, the LCD light valve, the field lens, the second reflector and the projection lens are set in sequence according to a direction of light.

The reflector provided by the present invention is significantly improved in the reflection efficiency while maintaining the low cost, so that the output brightness and the photoelectric efficiency of the projector including the reflector with low cost, which has a very positive effect.

Preferably, the optical system further comprises a first thermal diffusion structure which is provided at a shady face of the first substrate of the first reflector and a second thermal diffusion structure which is provided at a shady face of the second substrate of the second reflector. The thermal diffusion structures effectively improve the heat conduction and heat dissipation performance of the substrates, so that the heat converted by the substrates is quickly dissipated, which is beneficial to improve the stability and life of the optical system.

BRIEF DESCRIPTION OF THE DRAWINGS

In order to more clearly illustrate technical solutions of embodiments of the present invention or prior arts, the drawings used in the embodiments or prior arts will be briefly described as below. It should be understood that the following drawings show only some embodiments of the present invention. For those skilled in the art, other relevant drawings are also able to be obtained according to these drawings without any creative work.

The drawing is a structurally schematic view of an optical system of an LCD (liquid crystal display) projector.

In the drawings, 1: LED (light emitting diode) light source; 2: condenser; 3: first reflector; 4: collimating lens; 5: LCD light valve; 6: field lens; 7: second reflector; 8: projection lens; 9: first thermal diffusion structure; 10: second thermal diffusion structure; 31: first reflective film; 32: first substrate; 321: shady face of first substrate; 71: second reflective film; 72: second substrate; 721: shady face of second substrate.

DETAILED DESCRIPTION OF THE PREFERRED EMBODIMENT

In order to make those skilled in the art better understand the present invention, the present invention is further described in detail in combination with the accompanying drawings as follows. It should be understood that the specific embodiments described herein are merely illustrative of the present invention and are not intended to limit the present invention.

It should be noted that similar labels and letters represent similar items in the accompanying drawings. Therefore, once a certain item is defined in a drawing, there is no need for the item to be further defined and explained in the subsequent drawings. It should be noted that the orientation or position relationship indicated by the terms "center", "upper", "lower", "left", "right", "vertical", "horizontal", "inner" and "outer" is based on the orientation or position relationship shown in the accompanying drawings, or on the orientation or position relationship commonly used in the use of the product provided by the present invention. The terms are simply intended to facilitate the description and simplification of the present invention, rather than to indicate or imply that the device or element specified must have a specific orientation, be constructed and operated in a specific orientation, and therefore are unable to be understood as a limitation to the present invention. In addition, the terms "first", "second and "third" are used only for distinguishing and are unable to be understood as indicating or implying relative importance.

In addition, "horizontal", "vertical", "overhanging" and other terms do not mean that the component is required to be absolutely horizontal or overhanging, but may be slightly inclined. For example, "horizontal" only means that its direction is more horizontal than "vertical", it does not mean that the structure must be completely horizontal, but is able to be slightly inclined.

In the description of the present invention, it should also be noted that unless otherwise clearly defined, the terms "setting", "installation", "connection" and "communication" should be understood in a broad sense. For example, the term "connection" is able to be "fixed connection", "detachable connection", or "integrally connection"; also, is able to be "mechanical connection" or "electrical connection"; is able to be "direct connection", "indirectly connection through intermediate media" or "connection within two components". For those skilled in the art, the specific meaning of the above terms in the present invention is able to be understood in detail.

First Embodiment

Referring to the drawing, a reflector is illustrated, wherein the reflector comprises a reflective film and a substrate, wherein the reflective film is attached to the substrate.

Preferably, the reflective film is one of an ESR (enhanced specular reflector) reflective film of 3M Company, a DBEF (dual brightness enhancement film) reflective film of 3M Company, and a ReflecTech reflective film of SkyFuel Company.

Preferably, the substrate is one of a flat glass plate, a metal plate, a plastic plate and a ceramic plate.

When the reflective film according to the first preferred embodiment of the present invention adopts the ESR reflective film of 3M Company, the ESR reflective film has excellent characteristics such as high reflectivity (average up to 98%), high specularity (low diffuse reflection), and low cost. For example, a material with a length of 200 m and a width of 0.8 m is cut into more than 20,000 pieces of reflective films each of which has a length of 110 mm and a width of 60 mm; each reflective film cost less than CNY 0.8 and is attached to a substrate for forming a reflector with good performance and low cost.

If the substrate is an optical glass with a thickness of 1 mm, the cost is about CNY 0.3-1; if the substrate is an aluminum plate with a thickness of 1 mm, the cost is about CNY 1, so the total cost of the reflector is less than CNY 2. The performance of the reflector according to the first embodiment of the present invention is similar to that of the first reflector in the existing technology (which has the reflectivity of about 98%), but the reflector according to the first embodiment of the present invention is much lower in cost. The reflector according to the first embodiment of the present invention is equivalent to the third reflector in the existing technology in cost (which is about CNY 2), but the reflector according to the first embodiment of the present invention has higher reflectivity.

Therefore, the reflector according to the first embodiment of the present invention is significantly improved in the reflection efficiency while maintaining the low cost, or the reflector is significantly reduced in the manufacturing cost while achieving the high reflection efficiency, which has a very obvious innovative effect.

Embodiment 2

Referring to the drawing, an optical system of an LCD (liquid crystal display) projector is illustrated. The optical system comprises a first reflector 3, a second reflector 7, an LED (light emitting diode) light source 1, a condenser 2, a collimating lens 4, an LCD light valve 5, a field lens 6 and a projection lens 8, wherein the LED light source 1, the condenser 2, the first reflector 3, the collimating lens 4, the LCD light valve 5, the field lens 6, the second reflector 7 and the projection lens 8 are set in sequence according to a direction of light.

Further, the first reflector 3 comprises a first reflective film 31 and a first substrate 32, wherein the first reflective film 31 is preferably one of an ESR (enhanced specular reflector) reflective film of 3M Company, a DBEF (dual brightness enhancement film) reflective film of 3M Company, and a ReflecTech reflective film of SkyFuel Company; the first substrate 32 is one of a flat glass plate, a metal plate, a plastic plate and a ceramic plate.

Further, the second reflector 7 comprises a second reflective film 71 and a second substrate 72, wherein the second reflective film 71 is preferably one of an ESR (enhanced specular reflector) reflective film of 3M Company, a DBEF (dual brightness enhancement film) reflective film of 3M Company, and a ReflecTech reflective film of SkyFuel Company; the second substrate 72 is one of a flat glass plate, a metal plate, a plastic plate and a ceramic plate.

The first reflector 3 and the second reflector 7 provided by the present invention are significantly improved in the reflection efficiency while maintaining the low cost, so that the output brightness and the photoelectric efficiency of the projector are improved. The accumulated reflectivity of the two reflectors according to the second embodiment of the present invention is increased by more than 20%-28% compared with the reflectivity of the third reflector in the existing technology, which has a very positive effect.

If the first reflective film 31 chooses the DBEF reflective film of 3M Company or similar brightening film (which divides the natural light into two linearly polarized light with equal amplitude and orthogonal vibration, in which one linearly polarized light is for transmission, another linearly polarized light is for reflection), the angle of incidence is 45°. On the LCD projector, as long as the polarization direction of the reflected light (linearly polarized light) of the first reflector 3 is consistent with the polarizer direction of the LCD light valve 5, the reflectivity of the first reflector 3 is able to be considered infinitely close to 100%, because the linearly polarized light transmitted by the first reflective film 31 is not used by the LCD light valve 5 in essence. However, the first substrate 32 must be made of metal or ceramic materials with high thermal conductivity, which is useless for the LCD light valve 5 (in which about 50% of the natural light incident to the first reflective film 31 is transmitted and irradiated on the first substrate 32, if being reflected back by the surface of the first substrate 32, 50% of the natural light will be reflected back by the first reflective film 31 and irradiated again on the first substrate 32, which is repeated until most of the natural light is absorbed by the first substrate 32 and converted into heat).

Further, the optical system of the LCD projector further comprises a first thermal diffusion structure 9 which is provided at a shady face 321 of the first substrate 32 of the first reflector 3 and a second thermal diffusion structure 10 which is provided at a shady face 721 of the second substrate 72 of the second reflector 7, referring to rib structures in the drawing. The first thermal diffusion structure 9 and the second thermal diffusion structure 10 effectively improve the heat conduction and heat dissipation performance of the first substrate 32 and the second substrate 72, respectively, so that the heat converted by the first substrate 32 and the second substrate 72 is quickly dissipated, which is beneficial to improve the stability and life of the optical system. Since the first substrate 32 and the second substrate 72 are outside the light traveling range of the optical system, various thermal diffusion measures and forced convection are able to be used. Each of the first thermal diffusion structure 9 and the second thermal diffusion structure 10 is one of a fin radiator, a heat pipe radiator, a heat conduction diffuser and a semiconductor refrigerator.

The basic principles, main features and advantages of the present invention have been shown and described above. Those skilled in the art should understand that the present invention is not limited by the above-mentioned embodiments. The above-mentioned embodiments only illustrate the principles of the present invention. The present invention will have various changes and improvements without departing from the spirit and scope of the present invention, and these changes and improvements all fall within the protective scope of the present invention. The protective scope claimed by the present invention is defined by the appended claims and their equivalents.

What is claimed is:

1. An optical system of an LCD (liquid crystal display) projector, the optical system comprising an LED (light emitting diode) light source, a condenser, a first reflector, a collimating lens, an LCD light valve, a field lens, a second reflector and a projection lens, wherein:
   the LED light source, the condenser, the first reflector, the collimating lens, the LCD light valve, the field lens, the second reflector and the projection lens are set in sequence according to a direction of light;
   the first reflector comprises a first substrate and a first reflective film attached to the first substrate;
   the second reflector comprises a second substrate and a second reflective film attached to the second substrate;
   each of the first reflective film and the second reflective film is one of an ESR (enhanced specular reflector) reflective film of 3M Company, the DBEF (dual brightness enhancement film) reflective film of 3M Company, and a ReflecTech reflective film of SkyFuel Company;
   each of the first substrate and the second substrate is one of a flat glass plate, a metal plate, a plastic plate and a ceramic plate;
   the light emitted by the LED light source passes through the condenser, and then irradiates on the first reflector at an incident angle of 45° and is reflected; and then vertically passes through the collimating lens, the LCD light valve and the field lens in sequence, and then irradiates on the second reflector at the incident angle of 45° and is reflected again, and finally reaches the projection lens.

2. The optical system according to claim 1, further comprising a first thermal diffusion structure which is provided at a shady face of the first substrate of the first reflector, and a second thermal diffusion structure which is provided at a shady face of the second substrate of the second reflector.

3. The optical system according to claim 2, wherein:
   the first reflective film is the DBEF reflective film of 3M, which divides light from the condenser into two linearly polarized light with equal amplitude and orthogonal vibration, wherein one of the two linearly polarized light is for transmission, another of the two linearly polarized light is for reflection;
   a polarization direction of the another of the two linearly polarized light for reflection of the first reflector is consistent with a polarizer direction of the LCD light valve.

* * * * *